US012810786B2

(12) United States Patent
Pyun et al.

(10) Patent No.: US 12,810,786 B2
(45) Date of Patent: Nov. 24, 2026

(54) ELECTRONIC DEVICE

(71) Applicant: Samsung Display Co., Ltd., Yongin-si (KR)

(72) Inventors: Kihyun Pyun, Yongin-si (KR); Jungeon An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/267,297

(22) Filed: Jul. 11, 2025

(65) Prior Publication Data

US 2026/0080816 A1 Mar. 19, 2026

(30) Foreign Application Priority Data

Sep. 13, 2024 (KR) ........................ 10-2024-0125606

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01); *G09G 2330/022* (2013.01); *G09G 2330/025* (2013.01); *G09G 2330/028* (2013.01)

(58) Field of Classification Search
CPC ................................................ G09G 2330/021
See application file for complete search history.

(56) References Cited

U.S. PATENT DOCUMENTS

2014/0071111 A1* 3/2014 Said ......................... G09G 5/00 345/212
2014/0152638 A1* 6/2014 Kuo ....................... G09G 3/344 345/212
2016/0180771 A1* 6/2016 Jeong ................... G09G 3/3258 345/82
2016/0180815 A1* 6/2016 Pyo ...................... G09G 3/2022 345/82
2022/0254300 A1* 8/2022 Pyun .................... G09G 3/3233

FOREIGN PATENT DOCUMENTS

KR 10-1028291 4/2011
KR 10-1874641 6/2018
KR 10-2021-0026910 3/2021

* cited by examiner

*Primary Examiner* — Nan-Ying Yang
(74) *Attorney, Agent, or Firm* — Womble Bond Dickinson (US) LLP

(57) ABSTRACT

An electronic device includes: a display panel including a pixel; a panel driver configured to drive the display panel in response to a power-on signal; and a power manager configured to apply a power voltage to the panel driver in response to a power voltage start signal, wherein the panel driver includes a voltage generator configured to output a first power voltage to the display panel based on the power voltage, wherein the voltage generator and the power manager are connected through a voltage line, wherein the voltage generator is configured to output a drop voltage to the voltage line in response to a voltage drop start signal, and wherein based on the power voltage being output to the voltage line, voltage generator is configured to output the drop voltage to the voltage line.

20 Claims, 14 Drawing Sheets

ELECTRONIC DEVICE

CROSS-REFERENCE TO RELATED APPLICATION(S)

The present application claims priority to and the benefit of Korean Patent Application No. 10-2024-0125606, filed on Sep. 13, 2024, in the Korean Intellectual Property Office, the entire disclosure of which is incorporated herein by reference.

BACKGROUND

1. Field

Aspects of some embodiments of the present disclosure relate to an electronic device.

2. Description of the Related Art

Generally, a display device includes a display panel and a display panel driver. The display panel includes a plurality of gate lines, a plurality of data lines, and a plurality of pixels. The display panel driver includes a gate driver providing a gate signal to the gate lines, a data driver providing a data voltage to the data lines, and a driving controller controlling the gate driver and the data driver.

In order to reduce power consumption, etc., the display device may not include the power supply circuit that generates the power supply voltage, and the external power supply circuit may generate the power supply voltage. In this case, the plurality of pixels may directly receive the power supply voltage generated by the external power supply circuit. However, although the external power supply circuit may have relatively high efficiency, the power supply voltage generated by the external power supply circuit may have ripples.

The above information disclosed in this Background section is only for enhancement of understanding of the background and therefore the information discussed in this Background section does not necessarily constitute prior art.

SUMMARY

Aspects of some embodiments of the present disclosure relate to an electronic device. For example, aspects of some embodiments of the present disclosure relate to an electronic device including a display device.

Aspects of some embodiments include an electronic device that selectively uses an internal power supply voltage or an external power supply voltage.

According to some embodiments, an electronic device may include a display panel including a pixel, a panel driver configured to drive the display panel in response to a power-on signal and a power manager configured to apply a power voltage to the panel driver in response to a power voltage start signal. According to some embodiments, the panel driver may include a voltage generator configured to output a first power voltage to the display panel based on the power voltage. According to some embodiments, the voltage generator and the power manager may be connected through a voltage line. According to some embodiments, the voltage generator may output a drop voltage to the voltage line in response to a voltage drop start signal. According to some embodiments, after the power voltage is outputted to the voltage line, the drop voltage may be outputted to the voltage line.

According to some embodiments, a period in which the voltage generator and the power manager are operated may include first to fourth periods. According to some embodiments, in the first period, the power-on signal may have an activation level, the power voltage start signal may have inactivation level, and the voltage drop start signal may have an inactivation level.

According to some embodiments, in the second period, the power voltage start signal may have activation level, and the voltage drop start signal may have an inactivation level.

According to some embodiments, in the second period, the power manager may output the power voltage to the voltage line in response to the power voltage start signal.

According to some embodiments, the panel driver further may include a gate driver configured to output a scan gate signal and a sensing gate signal to the display panel, a data driver configured to apply a data voltage to the display panel and a driving controller configured to control the gate driver, the data driver and the voltage generator. In the second period, the driving controller may perform a first driving operation.

According to some embodiments, in the third period, the power voltage start signal may have inactivation level, and the voltage drop start signal may have an activation level.

According to some embodiments, in the third period, the voltage generator may output the drop voltage to the voltage line in response to the voltage drop start signal.

According to some embodiments, in the third period, the power manager may stop outputting the power voltage in response to the power voltage start signal.

According to some embodiments, the voltage generator may include a voltage drop circuit configured to output the drop voltage in response to the voltage drop start signal and a voltage output block connected to the voltage line and configured to output the first power voltage.

According to some embodiments, the panel driver may include a gate driver configured to output a scan gate signal and a sensing gate signal to the display panel, a data driver configured to apply a data voltage to the display panel, a sensing driver configured to perform a sensing operation to the display panel and a driving controller configured to control the gate driver, the data driver, the sensing driver and the voltage generator. According to some embodiments, the pixel may include a first transistor including a control electrode connected to a first node, a first electrode connected to a second node and a second electrode connected to a third node, a second transistor configured to apply the data voltage to the first node in response to the scan gate signal, a third transistor configured to connect the second node and a sensing line in response to the sensing gate signal and a light emitting element including a first electrode connected to the second node and a second electrode receiving a second power voltage.

According to some embodiments, an electronic device may include a display panel including a pixel, a panel driver configured to drive the display panel in response to a power-on signal and a power manager configured to apply a power voltage to the panel driver in response to a power voltage start signal. According to some embodiments, the panel driver may include a voltage generator configured to output a first power voltage to the display panel based on the power voltage. According to some embodiments, the voltage generator and the power manager may be connected through a voltage line. According to some embodiments, the voltage generator may output a drop voltage to the voltage line in response to a voltage drop start signal. According to some embodiments, the voltage generator may output a driving voltage different from the first power voltage and the drop voltage based on a block signal. According to some embodiments, after the driving voltage may be outputted to the voltage line, the drop voltage is outputted to the voltage line.

According to some embodiments, a period in which the voltage generator and the power manager are operated may include first to fourth periods. According to some embodiments, in the first period, the power-on signal may have an activation level, the power voltage start signal may have inactivation level, the voltage drop start signal may have an inactivation level, and the block signal may have an inactivation level.

According to some embodiments, in the second period, the power voltage start signal may have inactivation level, the voltage drop start signal may have an inactivation level, and the block signal may have an activation level.

According to some embodiments, in the second period, the driving voltage may be outputted to the voltage line in response to the block signal.

According to some embodiments, the panel driver may include a gate driver configured to output gate signals to the display panel, a data driver configured to apply a data voltage to the display panel and a driving controller configured to control the gate driver, the data driver and the voltage generator. According to some embodiments, the gate signals and the data voltage may be generated based on the driving voltage. According to some embodiments, in the second period, the driving voltage may be applied to the gate driver and the data driver in response to a driving voltage start signal.

According to some embodiments, in the third period, the power voltage start signal may have inactivation level, the voltage drop start signal may have an activation level, and the block signal may have an inactivation level.

According to some embodiments, in the third period, the drop voltage may be outputted to the voltage line in response to the voltage drop start signal. In the third period, an outputting of the driving voltage may be stopped.

According to some embodiments, in the fourth period, the power voltage start signal may have activation level, the voltage drop start signal may have an inactivation level, and the block signal may have an inactivation level.

According to some embodiments, in the fourth period, the power voltage may be outputted to the voltage line in response to the power voltage start signal. In the fourth period, an outputting of the drop voltage may be stopped.

According to some embodiments, the voltage generator may include a voltage drop circuit configured to output the drop voltage in response to the voltage drop start signal, a driving voltage generate circuit configured to output the driving voltage to a voltage block circuit in response to the block signal, the voltage drop circuit configured to output the driving voltage to the voltage line in response to the block signal and a voltage output circuit connected to the voltage line and configured to output the first power voltage.

As described above, a period in which a voltage generator and a power manager are operated may include a pre-charging period. According to some embodiments, in the pre-charging period, capacitors connected to a voltage line may be charged. Accordingly, when the power manager outputs the power voltage to the voltage after the drop voltage are outputted, the current applied to the voltage line may be gradually decreased. Accordingly, a display quality of the display panel may be relatively improved.

Additionally, the period in which the voltage generator and the power manager are operated may include the pre-charging period, so that the capacitors connected to the voltage line may be charged state in the detecting period. Accordingly, the electronic device may not include a circuit for blocking a connection between the power manager and the voltage generator. Accordingly, an integration of the electronic device may be relatively improved. Additionally, a power consumption of the electronic device may be relatively reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, aspects of some embodiments of the present disclosure will be explained in more detail with reference to the accompanying drawings.

Figure 1:
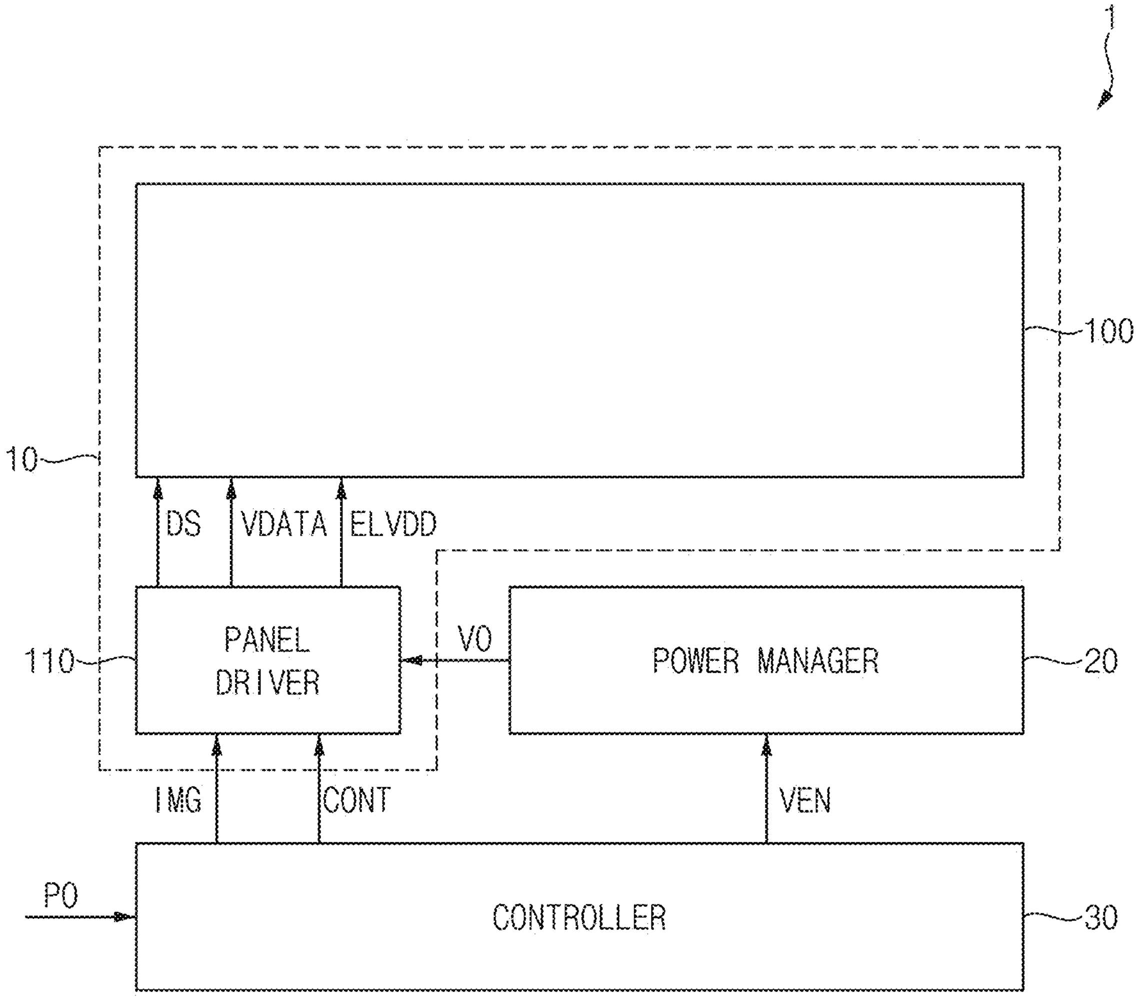
FIG. 1 is a block diagram illustrating an electronic device according to some embodiments of the present disclosure.

FIG. 1 is a block diagram illustrating an electronic device 1 according to some embodiments of the present disclosure.

An electronic device 1 may include a display device 10, a power manager 20, and a controller 30.

The display device may include a panel driver 110 and a display panel 100. The panel driver 110 may receive input image data IMG and an input control signal CONT from the controller 30. The panel driver 110 may receive a power voltage VO from the power manager 20. The panel driver 110 may generate a driving signal DS, a data voltage VDATA and a first power voltage ELVDD based on the input image data IMG, the input control signal CONT and the power voltage VO. The display panel 100 may display image based on the driving signal DS, the data voltage VDATA and the first power voltage ELVDD.

The power manager 20 may receive a power voltage start signal VEN from the controller 30. The power manager 20 may output the power voltage VO in response to the power voltage start signal VEN.

The controller 30 may control the display device 10 and the power manager 20. The controller 30 may be turned on in response to a power-on signal PO. For example, the controller 30 may perform various computing functions or various tasks. According to some embodiments, the controller 30 may be a micro-processor, a central processing unit (CPU), an application processor (AP), and the like. However, the present disclosure is not limited to a type of the controller 30. The controller 30 may be coupled to other components via an address bus, a control bus, a data bus, etc. According to some embodiments, the controller 30 may be coupled to an extended bus such as a peripheral component interconnection (PCI) bus.

Figure 2:
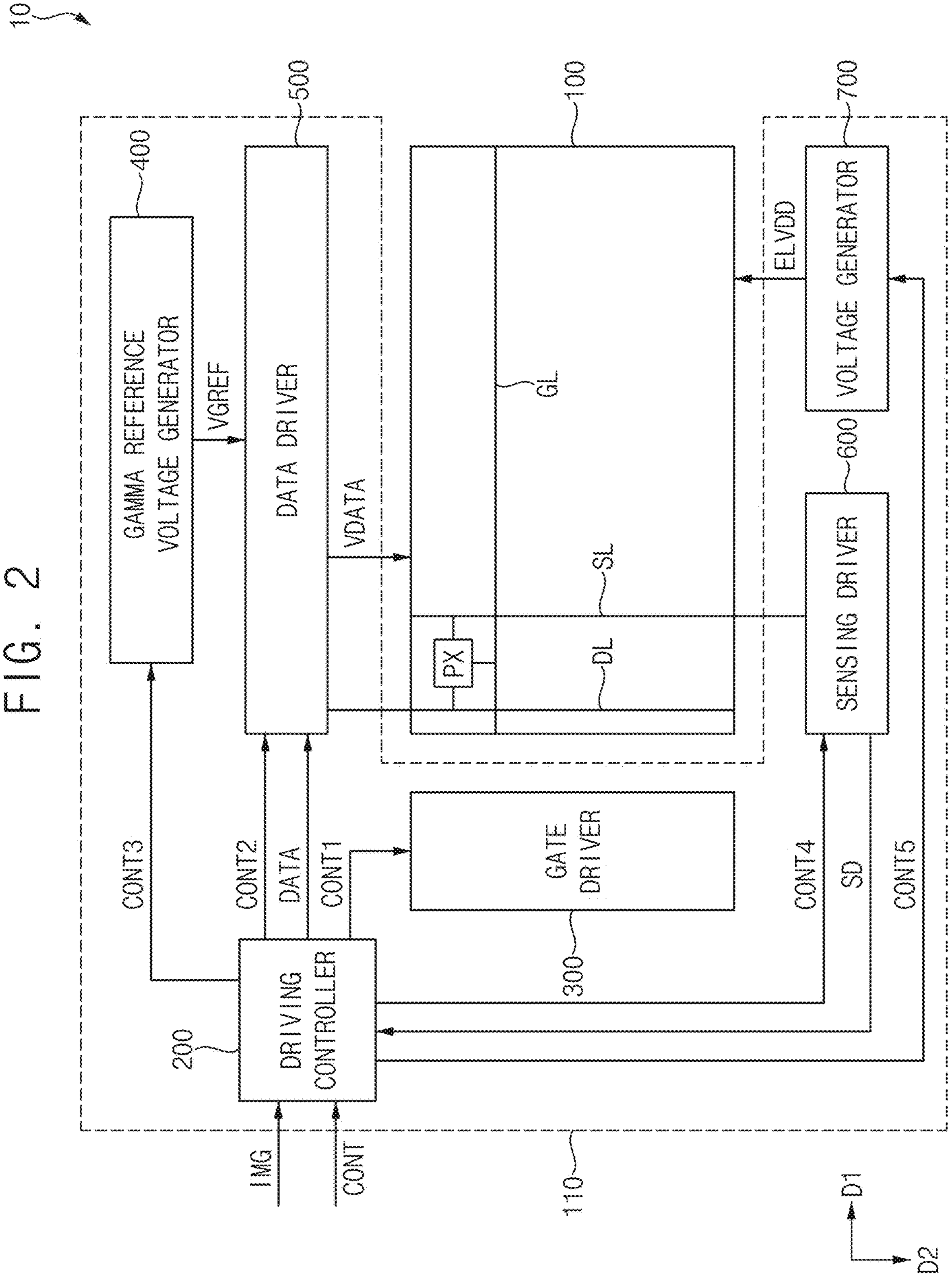
FIG. 2 is a block diagram illustrating an example of a display device of FIG. 1.

FIG. 2 is a block diagram illustrating an example of a display device 10 of FIG. 1.

Referring to FIG. 1 and FIG. 2, the display device 10 may include a display panel 100 and a panel driver 110. The panel driver 110 may include a driving controller 200, a gate driver 300, a gamma reference voltage generator 400, a data driver 500, a sensing driver 600 and a voltage generator 700.

The display panel 100 may have a display region on which images are displayed and a peripheral region adjacent to (e.g., in a periphery or outside a footprint of) the display region.

The display panel 100 may include a plurality of gate lines GL, a plurality of data lines DL, a plurality of sensing lines SL and a plurality of pixels PX electrically connected to the gate lines GL, the data lines DL and the sensing lines SL. The gate lines GL may extend in a first direction D1. The data lines DL may extend in a second direction D2 crossing the first direction D1. The sensing lines SL may extend in the second direction D2.

The driving controller 200 may receive input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the sensing driver 600 based on the input control signal CONT, and output the fourth control signal CONT4 to the sensing driver 600.

The gate driver 300 may generate gate signals driving the gate lines GL in response to the first control signal CONT1 received from the driving controller 200. The gate driver 300 may output the gate signals to the gate lines GL. For example, the gate signals may include a scan gate signal SC of FIG. 15 and a sensing gate signal SS of FIG. 16.

According to some embodiments, the gate driver 300 may be located in the peripheral region. According to some embodiments, the gate driver 300 may be integrated in the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL.

According to some embodiments, the data driver 500 may be located in the peripheral region. According to some embodiments, the data driver 500 may be integrated in the peripheral region.

The sensing driver 600 may receive the fourth control signal CONT4 from the driving controller 200. The sensing driver 600 may generate sensing data SD by sensing the pixels PX through the sensing lines SL. For example, the sensing driver 600 may sense a driving characteristic (e.g., a mobility and/or a threshold voltage) of a driving transistor by measuring a sensing current (or a sensing voltage) of the driving transistor of the pixels PX through the sensing line SL. For example, an operation sensing the driving characteristic (e.g., a mobility and/or a threshold voltage) of the driving transistor may be called a sensing operation.

According to some embodiments, the sensing driver 600 may be implemented as an integrated circuit separate from the integrated circuit of the data driver 500. According to some embodiments, the sensing driver 600 may be included in the data driver 500 or may be included in the driving controller 200.

The voltage generator 700 may generate a plurality of driving voltages in responds to the fifth control signal CONT5 received from the driving controller 200. The driving voltages may include the high power voltage ELVDD, the low power voltage ELVSS, the gate high voltage, the gate low voltage and the initialization voltage VINT of FIG. 15. However, embodiments according to the present disclosure are not limited to a voltage included in the driving voltages. The fifth control signal CONT5 may include a voltage generation control signal CDVS of FIG. 2.

The voltage generator 700 may generate power supply voltages in response to the fifth control signal CONT5 received from the driving controller 200. The voltage generator 700 may generate the supply voltages based on the power voltage VO. For example, the supply voltages may include a first power voltage ELVDD, a second power voltage ELVSS of FIG. 16 and a driving voltage DV of FIG. 9. For example, voltages (e.g., the data voltage VDATA, activation level and inactivation level of the gate signal, and etc.) for driving the display panel 100 based on the driving voltage DV of FIG. 9. The fifth control signal CONT5 may include a voltage drop start signal LEN and a block signal BEN.

Figure 3:
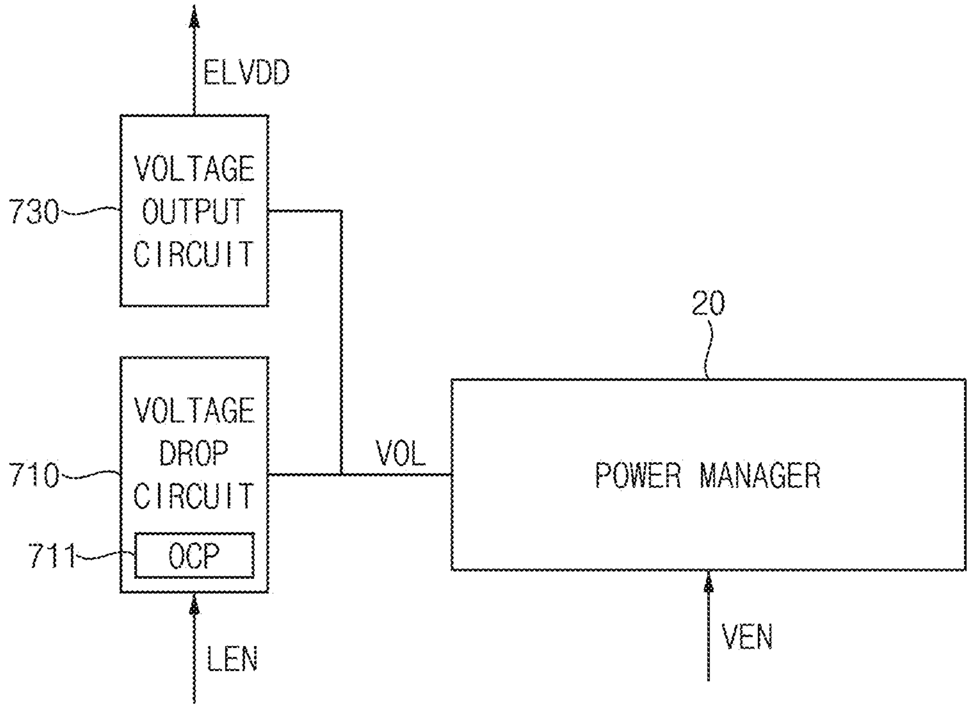
FIG. 3 is a block diagram illustrating an example of a voltage generator and a power manager.
Figure 4:
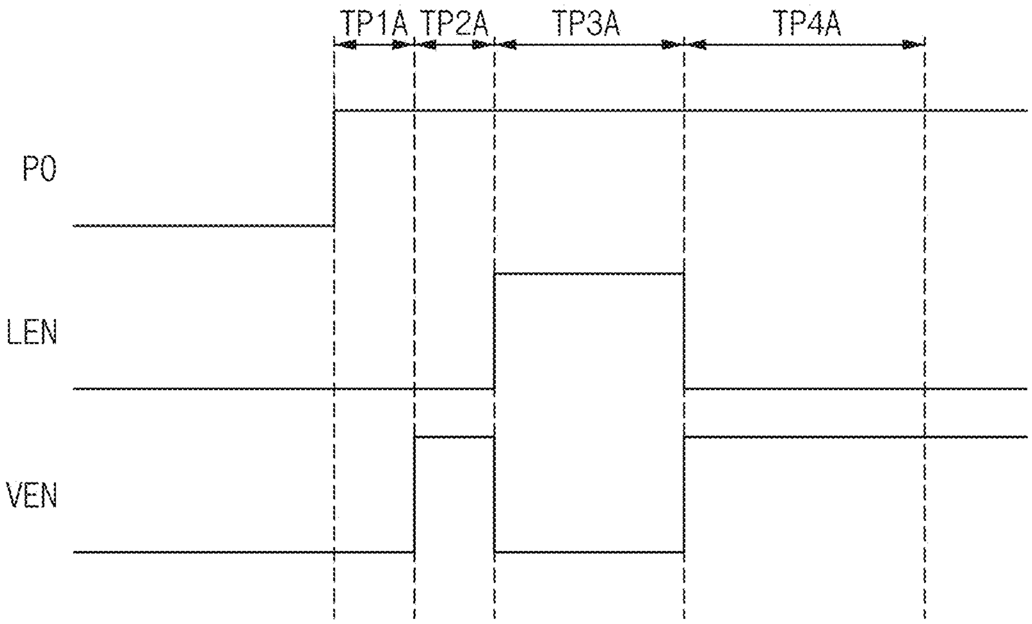
FIG. 4 is a timing diagram illustrating signals applied to a voltage generator and a power manager of FIG. 3.
Figure 5:
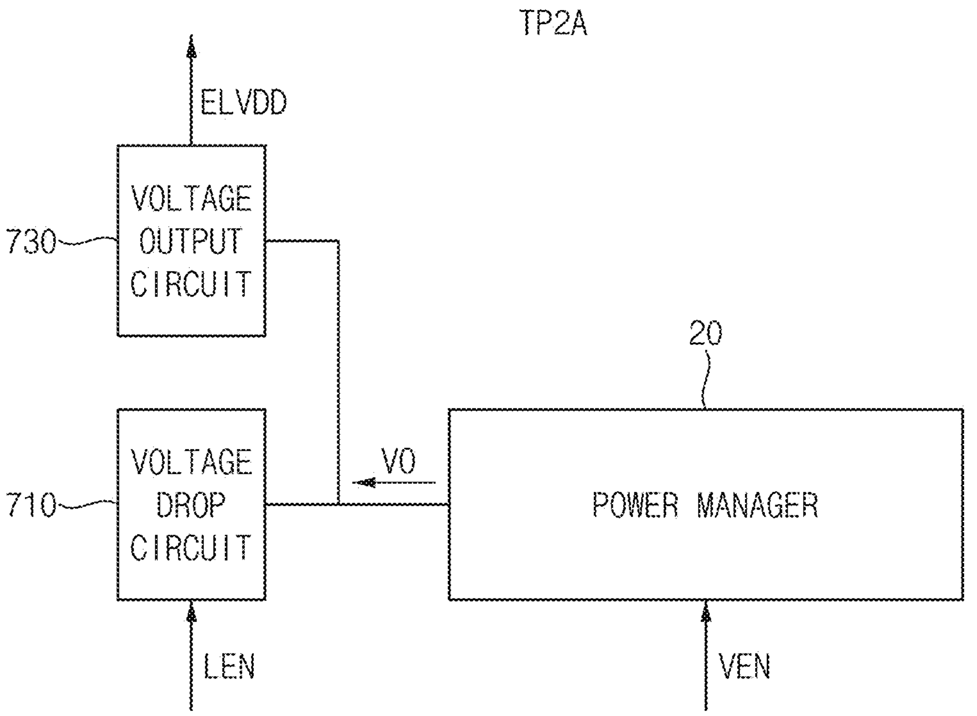
FIG. 5 is a block diagram illustrating an operation of a voltage generator and a power manager of FIG. 3 in a second period.
Figure 6:
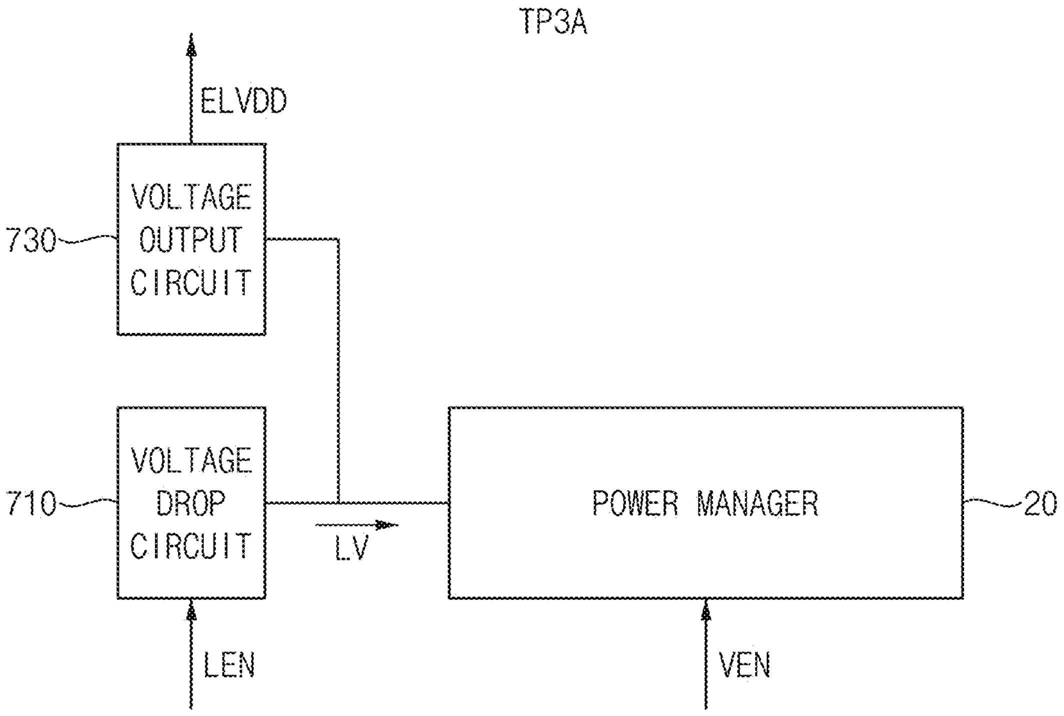
FIG. 6 is a block diagram illustrating an operation of a voltage generator and a power manager of FIG. 3 in a third period.
Figure 7:
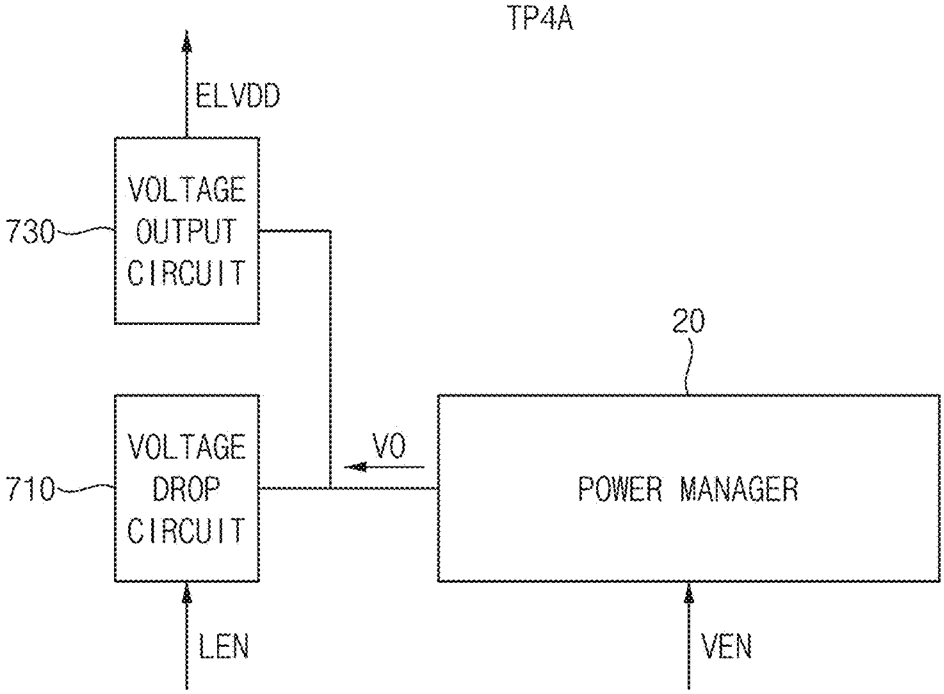
FIG. 7 is a block diagram illustrating an operation of a voltage generator and a power manager of FIG. 3 in a fourth period.

FIG. 3 is a block diagram illustrating an example of a voltage generator 700 and a power manager 20. FIG. 4 is a timing diagram illustrating signals applied to a voltage generator 700 and a power manager 20 of FIG. 3. FIG. 5 is a block diagram illustrating an operation of a voltage generator 700 and a power manager 20 of FIG. 3 in a second period TP2A. FIG. 6 is a block diagram illustrating an operation of a voltage generator 700 and a power manager 20 of FIG. 3 in a third period TP3A. FIG. 7 is a block diagram illustrating an operation of a voltage generator 700 and a power manager 20 of FIG. 3 in a fourth period TP4A.

Referring to FIG. 1 to FIG. 7, the voltage generator 700 may include a voltage drop circuit 710 and a voltage output circuit 730. The voltage generator 700 and the power manager 20 may be connected through a voltage line VOL.

The voltage drop circuit 710 may generate a drop voltage LV in response to the voltage drop start signal LEN. The voltage drop circuit 710 may output the drop voltage LV to the voltage line VOL in response to the voltage drop start signal LEN.

For example, the voltage drop circuit 710 may a reference voltage generator that generates a reference voltage, and a drop regulator performing a voltage drop regulating operation for the reference voltage to generate the drop voltage LV. However, the present disclosure is not limited to a structure of the voltage drop circuit 710. Additionally, the voltage drop circuit 710 may provide drop voltage LV to the plurality of pixels PX through the voltage line VOL. According to some embodiments, the voltage drop circuit 710 may further include an overcurrent protection ("OCP") circuit 711 performing an overcurrent detection operation that determines whether a current flowing through the voltage line VOL is greater than or equal to a reference current. The voltage drop circuit 710 performing the voltage drop regulating operation may have a relatively low power conversion efficiency compared to the power manager 20, but the drop voltage LV generated by the voltage drop circuit 710 may have a relatively small ripple compared to the power voltage VO by the power manager 20.

The voltage output circuit 730 may output the first power voltage ELVDD to the voltage line VOL. For example, the voltage output circuit 730 may include lines for outputting the first power voltage ELVDD. For example, the voltage outputting circuit 730 may formed as the voltage line VOL.

The power manager 20 may output the power voltage VO to the voltage line VOL in response to the power voltage start signal VEN. According to some embodiments, the power manager 20 may be implemented as a switching mode power supply ("SMPS") circuit having relatively high power conversion efficiency compared with the voltage drop circuit 710. The power voltage VO generated by power manager 20 may have a relatively large ripple compared with drop voltage LV generated by the voltage drop circuit 710.

A period in which the voltage generator 700 and the power manager 20 are operated may include first to fourth periods TP1A, TP2A, TP3A and TP4A.

In the first period TP1A, the power-on signal PO may have an activation level, the voltage drop start signal LEN may have an inactivation level, the power voltage start signal VEN may have an inactivation level. For example, the first period TP1A may be called as a power-on period.

In the second period TP2A following the first period TP1A, the power-on signal PO may have an activation level, the voltage drop start signal LEN may have an inactivation level, the power voltage start signal VEN may have an activation level. For example, the second period TP2A may be called as a pre-charging period.

In the second period TP2A, the power voltage start signal VEN may have an activation level. The power manager 20 may output the power voltage VO to the voltage line VOL in response to the power voltage start signal VEN. Accordingly, capacitors connected to the voltage lines VOL may be charged.

In the third period TP3A following the second period TP2A, the power-on signal PO may have an activation level, the voltage drop start signal LEN may have an activation level, the power voltage start signal VEN may have an inactivation level. For example, the third period TP3A may be called as a detecting period.

In the third period TP3A, the voltage drop circuit 710 may output the drop voltage LV to the voltage line VOL in response to the voltage drop start signal LEN. Additionally, the OCP circuit 711 may perform an overcurrent detection operation that determines whether a current flowing through the voltage line VOL is greater than or equal to a reference current. The power voltage VO may not be provided to the voltage line VOL, and an abnormal event of the display panel 100, such as an overcurrent of the display panel 100, may be detected. In the third period TP3A, the power manager 20 may stop outputting the power voltage VO in response to the power voltage start signal VEN.

In the third period TP3A, the capacitors of the voltage lines VOL may be charged state. Accordingly, an accuracy of the overcurrent detection operation may be relatively improved.

In the fourth period TP4A following the third period TP3A, the power-on signal PO may have an activation level, the voltage drop start signal LEN may have an inactivation level, the power voltage start signal VEN may have an activation level. For example, the fourth period TP4A may be called as a voltage apply period.

In the fourth period TP4A, the power manager 20 may output the power voltage VO to the voltage line VOL. In the fourth period TP4A, the voltage drop circuit 710 may stop outputting the drop voltage LV. In the fourth period TP4A, the capacitors of the voltage lines VOL may be charged state. Accordingly, the current applied to the voltage line VOL may be gradually increased. For example, an inrush current may be reduced. Accordingly, a display quality of the display panel 100 may be relatively improved.

The voltage drop circuit 710 may have relatively low power conversion efficiency compared to the power manager 20, when the power voltage VO is applied to the voltage line VOL without the pre-charging period, the charging efficiency of the capacitors connected to the voltage line VOL may be decreased. Accordingly, when the power manager 20 outputs the power voltage VO, the current applied to the voltage line VOL may be suddenly increased. Accordingly, the display quality of the display panel 100 may be deteriorated.

According to some embodiments, the period in which the voltage generator 700 and the power manager 20 are operated may include the pre-charging period. In the pre-charging period, the capacitors connected to the voltage line VOL may be charged. Accordingly, when the power manager 20 outputs the power voltage VO to the voltage line VOL after the drop voltage LV are outputted, the current applied to the voltage line VOL may be gradually decreased. Accordingly, the display quality of the display panel 100 may be relatively improved.

Additionally, according to some embodiments, the period in which the voltage generator 700 and the power manager 20 are operated may include the pre-charging period, so that the capacitors connected to the voltage line VOL may be charged state in the detecting period. Accordingly, the electronic device 1 may not include a circuit for blocking a connection between the power manager 20 and the voltage generator 700. Accordingly, an integration of the electronic device 1 may be relatively improved. Additionally, a power consumption of the electronic device 1 may be reduced.

Figure 8:
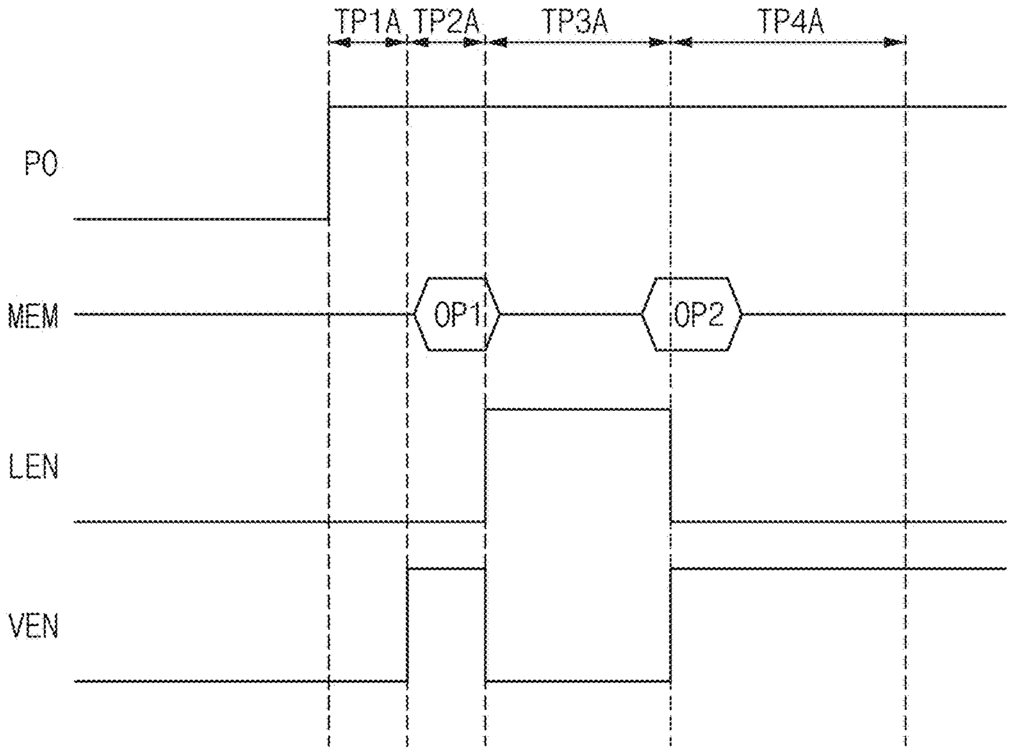
FIG. 8 is a timing diagram illustrating an example of signals applied to the voltage generator and a power manager of FIG. 3.

FIG. 8 is a timing diagram illustrating an example of signals applied to the voltage generator 700 and a power manager 20 of FIG. 3.

Referring to FIG. 1 to FIG. 8, in the second period TP2A, the driving controller 200 may perform a first driving operation OP1. For example, a memory circuit MEM included in a driving controller 200 may perform the first driving operation OP1. For example, the first driving operation OP1 may be an operation which loads a look-up table. However, the present disclosure is not limited to a type of the first driving operation OP1. For example, a period in which the first driving operation OP1 is performed and the pre-charging period may be synchronized. For example, in the period in which the first driving operation OP1 is performed, the pre-charging period may be start.

In the third period TP3A, the driving controller 200 may perform a second driving operation OP2. For example, a memory circuit MEM included in a driving controller 200 may perform the second driving operation OP2. For example, the second driving operation OP1 may be an operation which loads a compensation data. However, the present disclosure is not limited to a type of the second driving operation OP1. For example, in the period in which the second driving operation OP2 is performed, the pre-charging period may be end.

Figure 9:
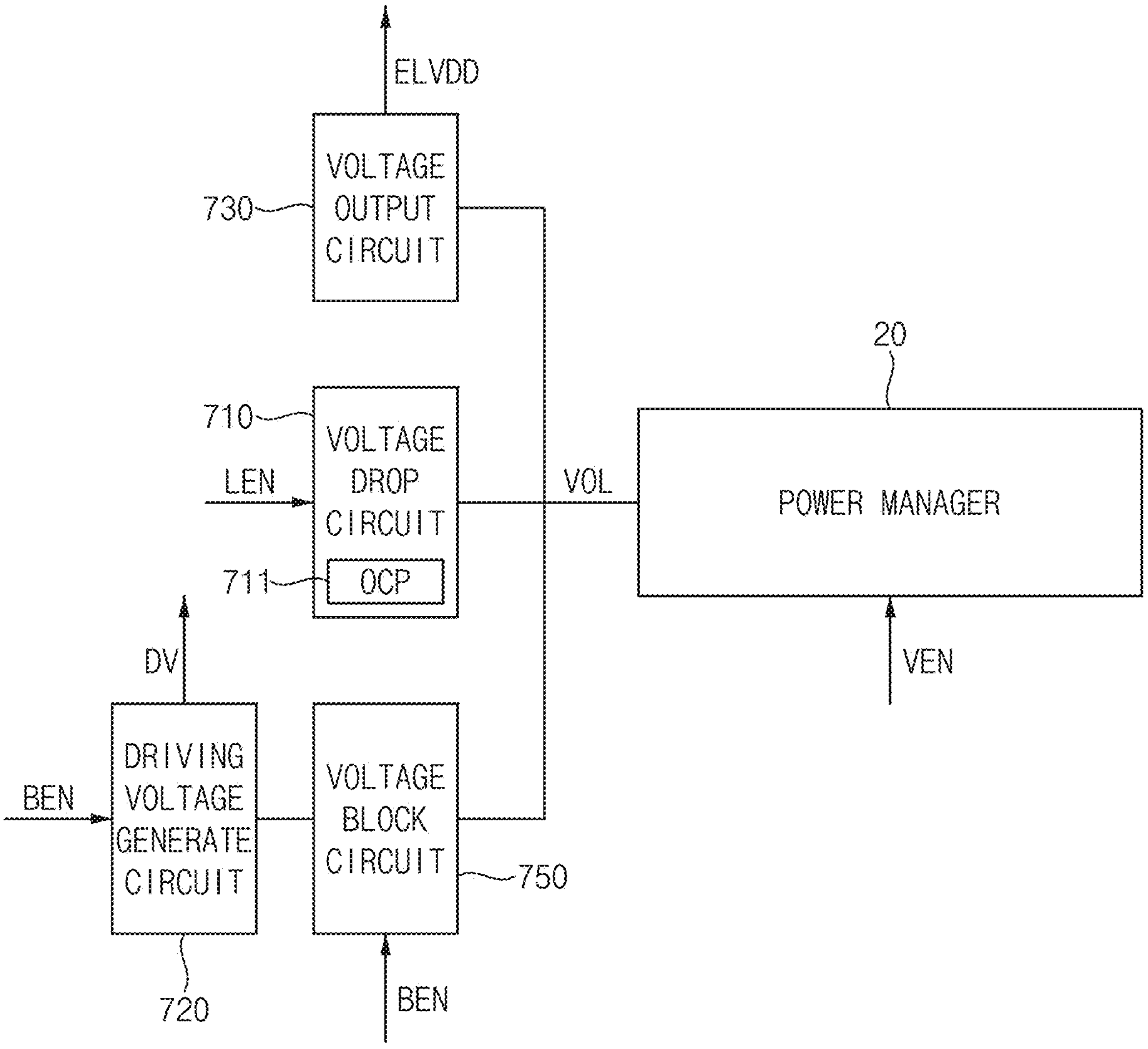
FIG. 9 is a block diagram illustrating an example of a voltage generator and a power manager.
Figure 10:
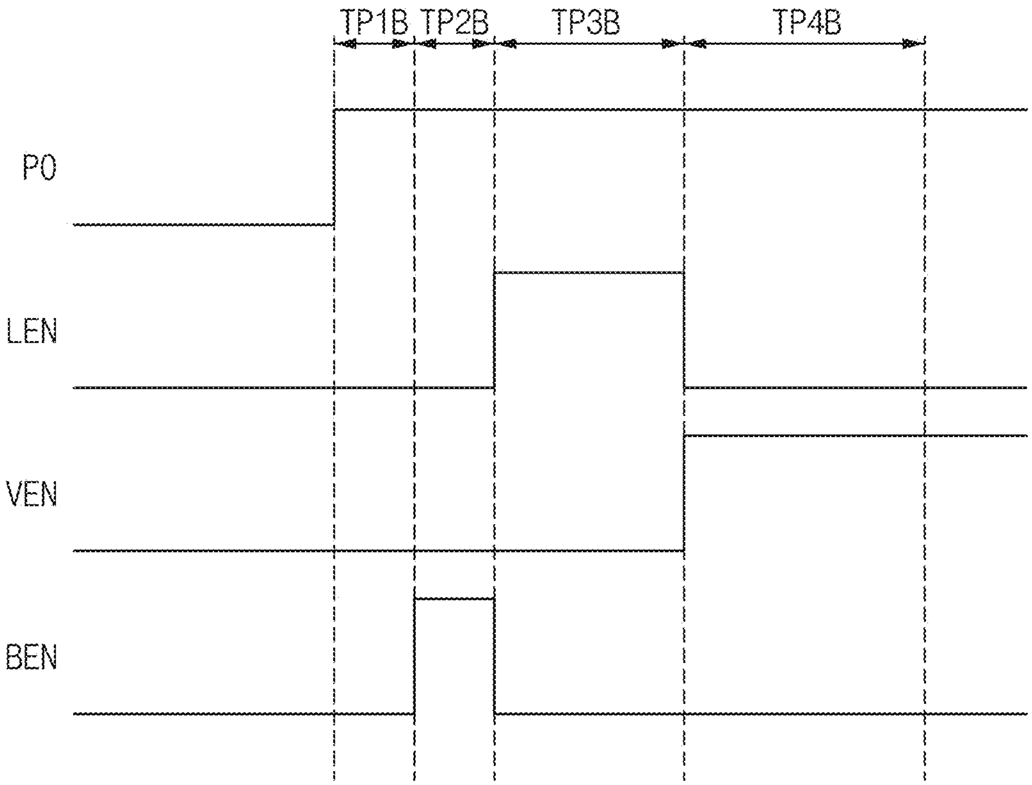
FIG. 10 is a timing diagram illustrating signals applied to a voltage generator and a power manager of FIG. 9.
Figure 11:
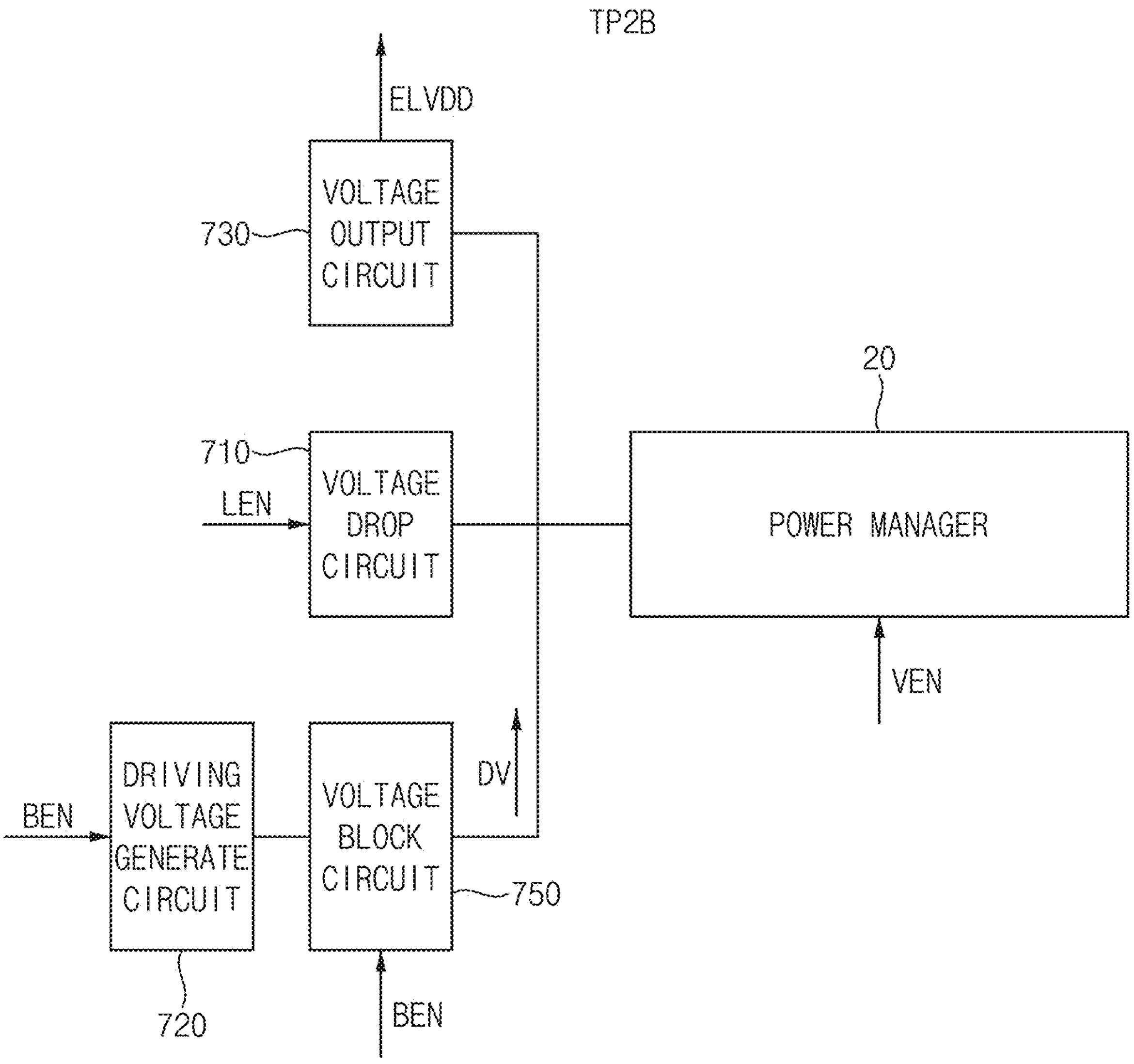
FIG. 11 is a block diagram illustrating an operation of a voltage generator and a power manager of FIG. 9 in a second period.
Figure 12:
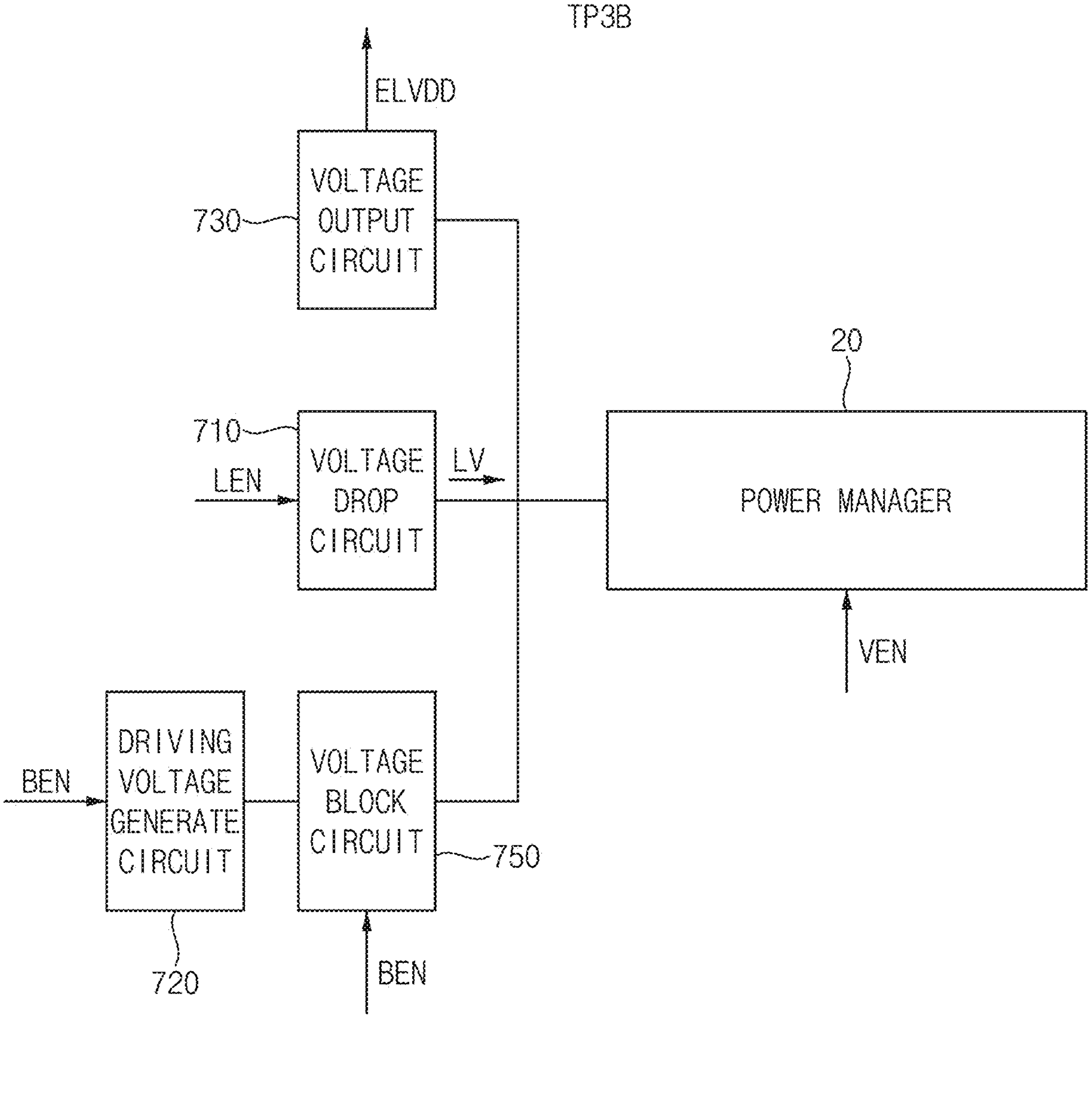
FIG. 12 is a block diagram illustrating an operation of a voltage generator and a power manager of FIG. 9 in a third period.
Figure 13:
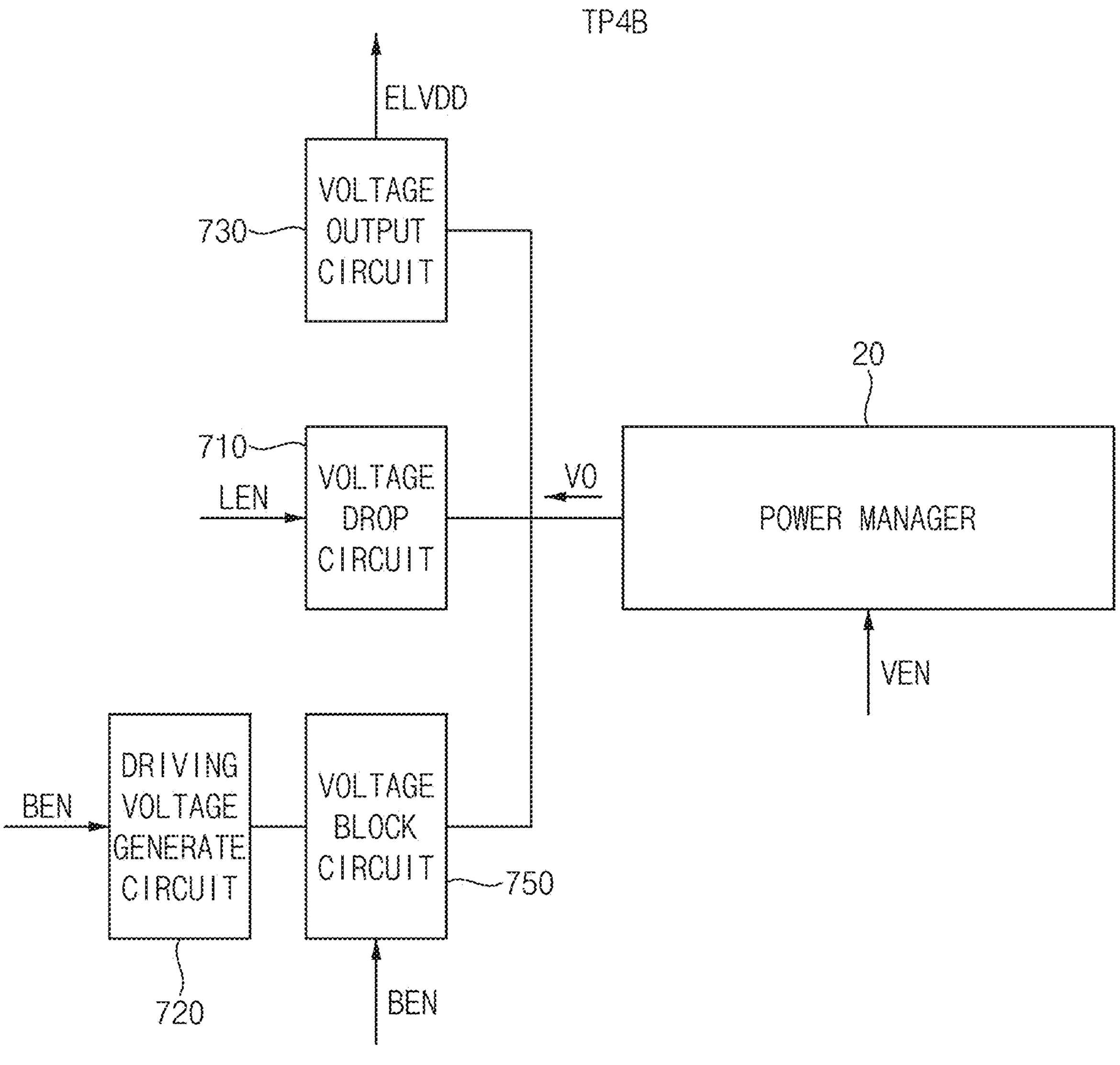
FIG. 13 is a block diagram illustrating an operation of a voltage generator and a power manager of FIG. 9 in a fourth period.

FIG. 9 is a block diagram illustrating an example of a voltage generator 700 and a power manager 20. FIG. 10 is a timing diagram illustrating signals applied to a voltage generator 700 and a power manager 20 of FIG. 9. FIG. 11 is a block diagram illustrating an operation of a voltage generator 700 and a power manager 20 of FIG. 9 in a second period TP2B. FIG. 12 is a block diagram illustrating an operation of a voltage generator 700 and a power manager 20 of FIG. 9 in a third period TP3B. FIG. 13 is a block diagram illustrating an operation of a voltage generator 700 and a power manager 20 of FIG. 9 in a fourth period TP4B.

Referring to FIG. 1, FIG. 2 and FIG. 9 to FIG. 13, the voltage generator 700 may include the voltage drop circuit 710, a driving voltage generate circuit 720, the voltage output circuit 730 and a voltage block circuit 750. The voltage generator 700 and the power manager 20 may be connected through a voltage line VOL.

The voltage generator 700 of FIG. 9 is the same (or substantially the same) as the voltage generator 700 of FIG. 3, except that the voltage generator 700 of FIG. 9 further includes the driving voltage generate circuit 720 and the voltage block circuit 750, so that the same reference numerals will be used and some repetitive explanation concerning the above elements may be omitted.

The driving voltage generate circuit 720 may generate the driving voltage DV. The driving voltage generate circuit 720 may output the driving voltage DV to the voltage line VOL in response to the block signal BEN.

The voltage block circuit 750 may apply the driving voltage to the voltage line VOL in response to the block signal BEN. For example, the voltage block circuit 750 may selectively apply the driving voltage DV to the voltage line VOL in response to the block signal BEN.

A period in which the voltage generator 700 and the power manager 20 are operated may include first to fourth periods TP1B, TP2B, TP3B and TP4B.

In the first period TP1B, the power-on signal PO may have an activation level, the voltage drop start signal LEN may have an inactivation level, the power voltage start signal VEN may have an inactivation level, and the block signal BEN may have the inactivation level. For example, the first period TP1B may be called as a power-on period.

In the second period TP2B following the first period TP1B, the power-on signal PO may have an activation level, the voltage drop start signal LEN may have an inactivation level, the power voltage start signal VEN may have an activation level, and the block signal BEN may have the activation level. For example, the second period TP2B may be called as a pre-charging period.

In the second period TP2B, the block signal BEN may have an activation level. The driving volage generate circuit 720 may output the driving voltage DV in response to the block signal BEN. The voltage block circuit 750 may output the driving voltage line VOL to the voltage line VOL in response to the block signal BEN. Accordingly, capacitors connected to the voltage lines VOL may be charged.

In the third period TP3B following the second period TP2B, the power-on signal PO may have an activation level, the voltage drop start signal LEN may have an activation level, the power voltage start signal VEN may have an inactivation level, and the block signal BEN may have the inactivation level. For example, the third period TP3B may be called as a detecting period.

In the third period TP3B, the voltage drop circuit 710 may output the drop voltage LV to the voltage line VOL in response to the voltage drop start signal LEN. Additionally, the OCP circuit 711 may perform an overcurrent detection operation that determines whether a current flowing through the voltage line VOL is greater than or equal to a reference current. The power voltage VO may not be provided to the voltage line VOL, and an abnormal event of the display panel 100, such as an overcurrent of the display panel 100, may be detected. In the third period TP3B, the power manager 20 may stop outputting the power voltage VO in response to the power voltage start signal VEN.

In the third period TP3B, the capacitors of the voltage lines VOL may be charged state by the driving voltage DV. Accordingly, an accuracy of the overcurrent detection operation may be relatively improved.

In the fourth period TP4B following the third period TP3B, the power-on signal PO may have an activation level, the voltage drop start signal LEN may have an inactivation level, the power voltage start signal VEN may have an activation level, and the block signal BEN may have the inactivation level. For example, the fourth period TP4B may be called as a voltage apply period. In the fourth period TP4B, an outputting of the drop voltage LV may be stopped. In the fourth period TP4B, the power voltage VO may be outputted to the voltage line VOL.

In the fourth period TP4B, the capacitors of the voltage lines VOL may be charged state. Accordingly, the current applied to the voltage line VOL may be gradually increased. For example, an inrush current may be reduced. Accordingly, a display quality of the display panel 100 may be relatively improved.

The voltage drop circuit 710 may have relatively low power conversion efficiency compared to the power manager 20, when the power voltage VO is applied to the voltage line VOL without the pre-charging period, the charging efficiency of the capacitors connected to the voltage line VOL may be decreased. Accordingly, when the power manager 20 outputs the power voltage VO, the current applied to the voltage line VOL may be suddenly increased. Accordingly, the display quality of the display panel 100 may be deteriorated.

According to some embodiments, the period in which the voltage generator 700 and the power manager 20 are operated may include the pre-charging period. In the pre-charging period, the capacitors connected to the voltage line VOL may be charged. Accordingly, when the power manager 20 outputs the power voltage VO to the voltage line VOL after the drop voltage LV are outputted, the current applied to the voltage line VOL may be gradually decreased. Accordingly, the display quality of the display panel 100 may be relatively improved.

Figure 14:
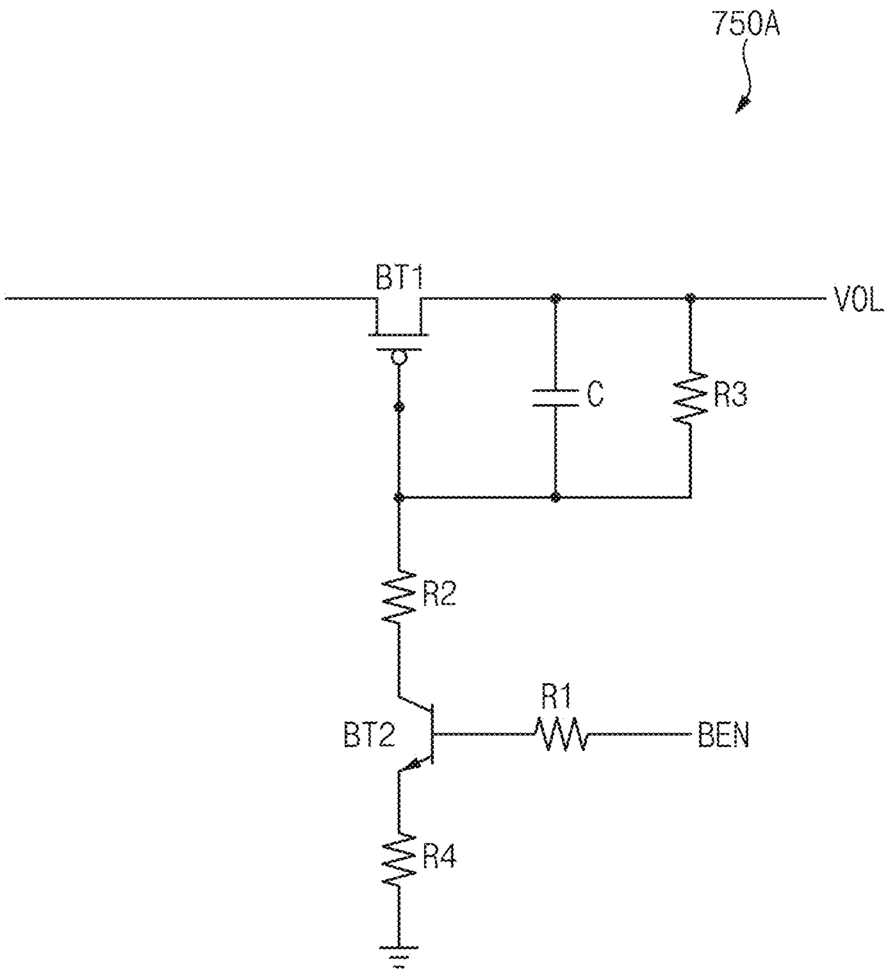
FIG. 14 is a circuit diagram illustrating an example of a voltage block circuit of FIG. 9.

FIG. 14 is a circuit diagram illustrating an example of a voltage block circuit 750 of FIG. 9.

Referring to FIG. 1, FIG. 2 and FIG. 9 to FIG. 14, the voltage block circuit 750 may include a first transistor BT1, a second transistor BT2, a capacitor C, first to fourth resistors R1, R2, R3 and R4.

The first transistor BT1 may be connected between the voltage line VOL and the driving voltage generate circuit 720. When the first transistor BT1 is turned on, the first transistor BT1 may apply the driving voltage DV generated by the driving voltage generate circuit 720 to the voltage line VOL. When the first transistor T1 is turned off, the first transistor T1 may block the driving voltage DV from being applied to the voltage line VOL. According to some embodiments, the first transistor BT1 may include a control electrode (e.g., a gate) connected to the second resistor R2, a first electrode (e.g., a source) connected to the driving voltage generate circuit 720, and a second electrode (e.g., a drain) connected to the voltage line VOL.

The capacitor C may be connected between the first electrode of the first transistor T1 and the second resistor R2, and the third resistor R3 may be connected in parallel with the capacitor C between the first electrode of the first transistor T1 and the second resistor R2. For example, the capacitor C and the third resistor R3 may be connected in parallel between the gate and the source of the first transistor T1.

The second transistor BT2 may selectively turn on the first transistor T1 in response to the block signal BEN. According to some embodiments, the second transistor BT2 may include a control electrode (e.g., a base) which receives the block signal BEN through the first resistor R1, a first electrode (e.g., a collector) connected to the second resistor R2, and a second electrode (e.g., an emitter) which receives a ground voltage through the fourth resistor R4.

The first resistor R1 may include a first terminal which receives the block signal BEN, and a second terminal connected to the control electrode of the second transistor BT2. Thus, a current corresponding to block signal BEN may be provided to the control electrode of the second transistor BT2 through the first resistor R1. Further, the second resistor R2 may be connected between the first terminal of the second transistor BT2 and the control electrode of the first transistor BT1, and the fourth resistor R4 may be connected between the second terminal of the second transistor T2 and the ground voltage.

According to some embodiments, the first transistor BT1 may be a P-type metal oxide semiconductor ("PMOS") transistor, and the second transistor BT2 may be an N-type bipolar junction transistor ("BJT"), but is not limited thereto.

Figure 15:
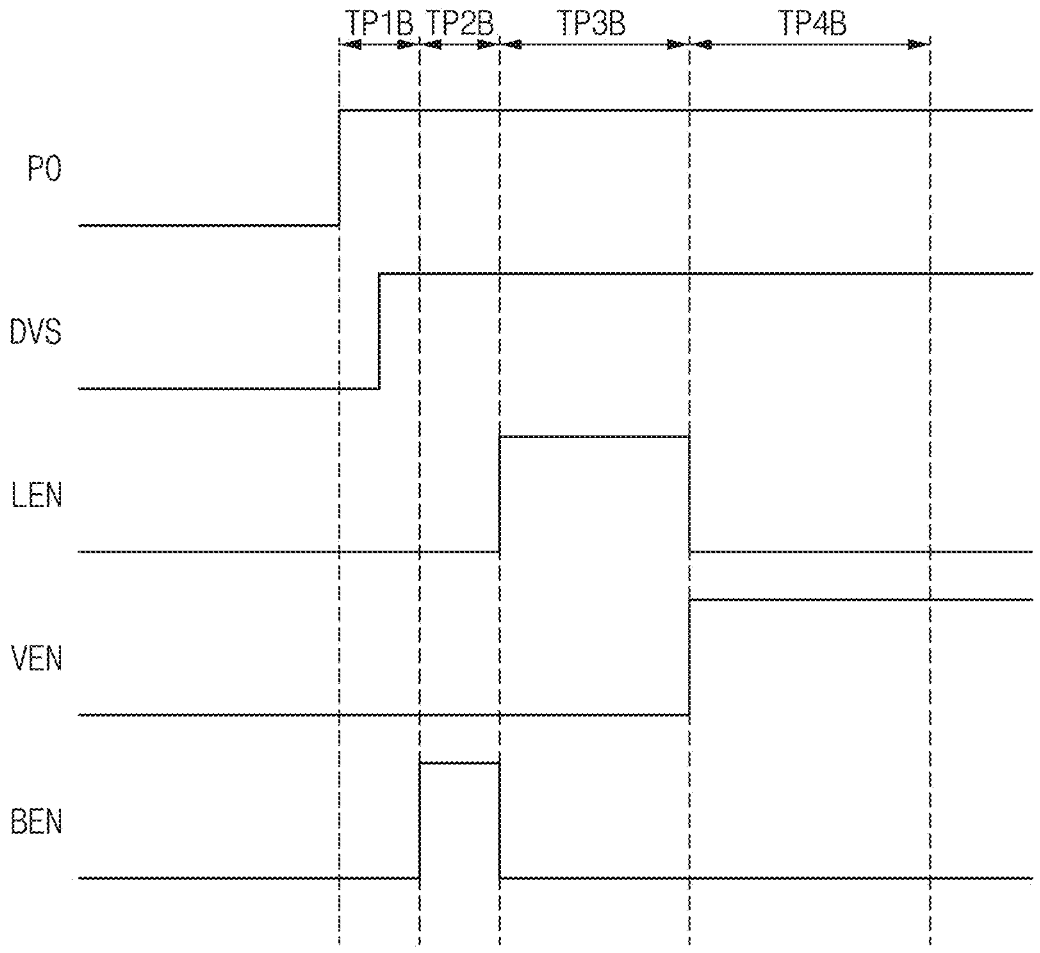
FIG. 15 is a timing diagram illustrating an example of signals applied to a voltage generator and a power manager of FIG. 3.

FIG. 15 is a timing diagram illustrating an example of signals applied to a voltage generator 700 and a power manager 20 of FIG. 3.

Referring to FIG. 1, FIG. 2, FIG. 9 to FIG. 13 and FIG. 15, in the first period TP1B, the driving controller 200 may output driving voltage start signal DVS. The voltage generator 700 may output the driving voltage DV in response to the driving voltage start signal DVS. For example, the voltage generator 700 may output the driving voltage DV to the gate driver 300 and the data driver 500. In the pre-charging period, the driving voltage start signal DVS may maintain an activation level. Accordingly, in the pre-charging period, the voltage generator 700 may output the driving voltage DV in response to the driving voltage start signal DVS.

Figure 16:
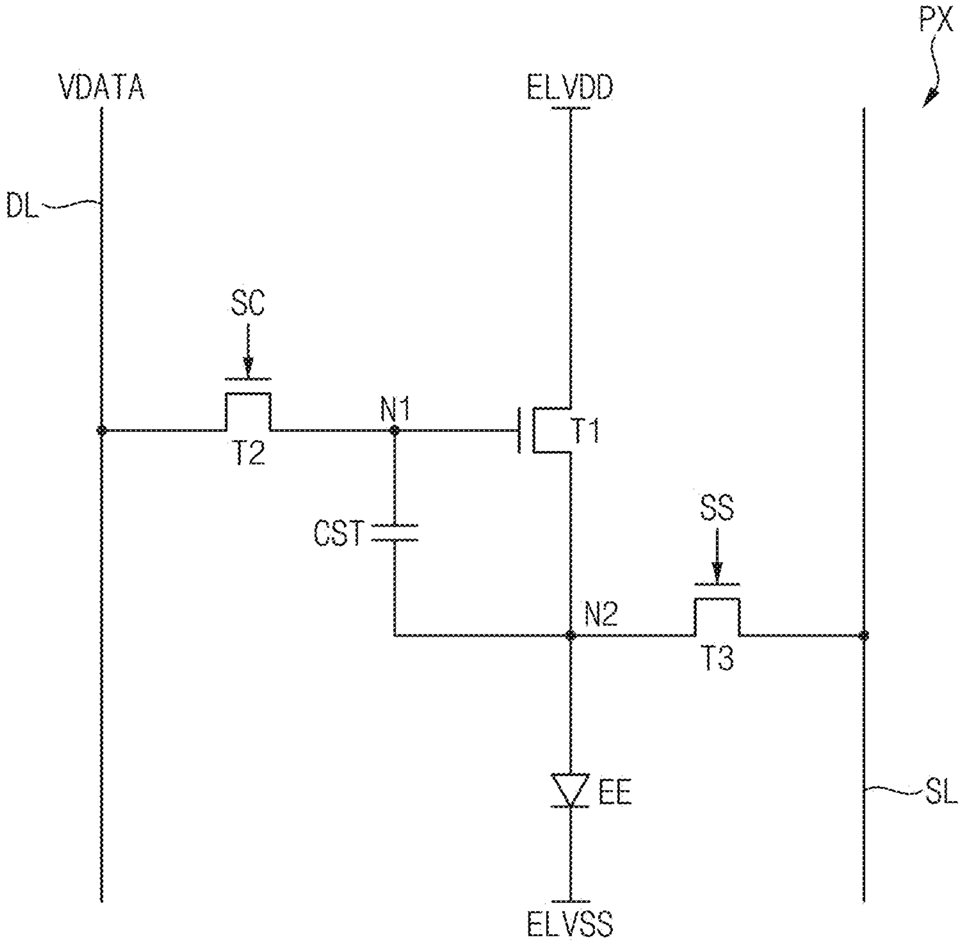
FIG. 16 is a circuit diagram illustrating an example of a pixel of FIG. 2.

FIG. 16 is a circuit diagram illustrating an example of a pixel PX of FIG. 2.

Referring to FIG. 1, FIG. 2 and FIG. 16, the pixel may include a first transistor T1, a second transistor T2, a third transistor T2, a storage capacitor CST and a light emitting element EE. For example, the pixel PX may have a 3T-1C structure. However, the present disclosure is not limited to a structure of the pixel PX.

The first transistor T1 may include a control electrode connected to a first node N1, a first electrode receiving the first power voltage ELVDD and a second electrode connected to a second node N2. The first transistor T1 may generate a driving current based on a voltage of the first node N1. For example, the first transistor T1 may be called as a driving transistor.

The second transistor T2 may include a control electrode receiving the scan gate signal SC, a first electrode receiving the data voltage VDATA and a second electrode connected to the first node N1. The second transistor T2 may apply the data voltage VDATA to the first node N1 in response to the scan gate signal SC. For example, the second transistor T2 may be called as a write transistor.

The third transistor T3 may include a control electrode receiving the sensing gate signal SS, a first electrode connected to the sensing line SL and the second electrode connected to the second node N2. The third transistor T3 may connect the sensing line SL and the second node N2 in response to the sensing gate signal SS. For example, the third transistor T3 may be called as a sensing transistor.

The storage capacitor CST may include a first electrode connected to the first node N1 and a second electrode connected to the second node N2.

The light emitting element EE may include a first electrode connected to the second node N2 and a second electrode receiving the second power voltage ELVSS. The light emitting element EE may emit light based on the driving current.

Figure 17:
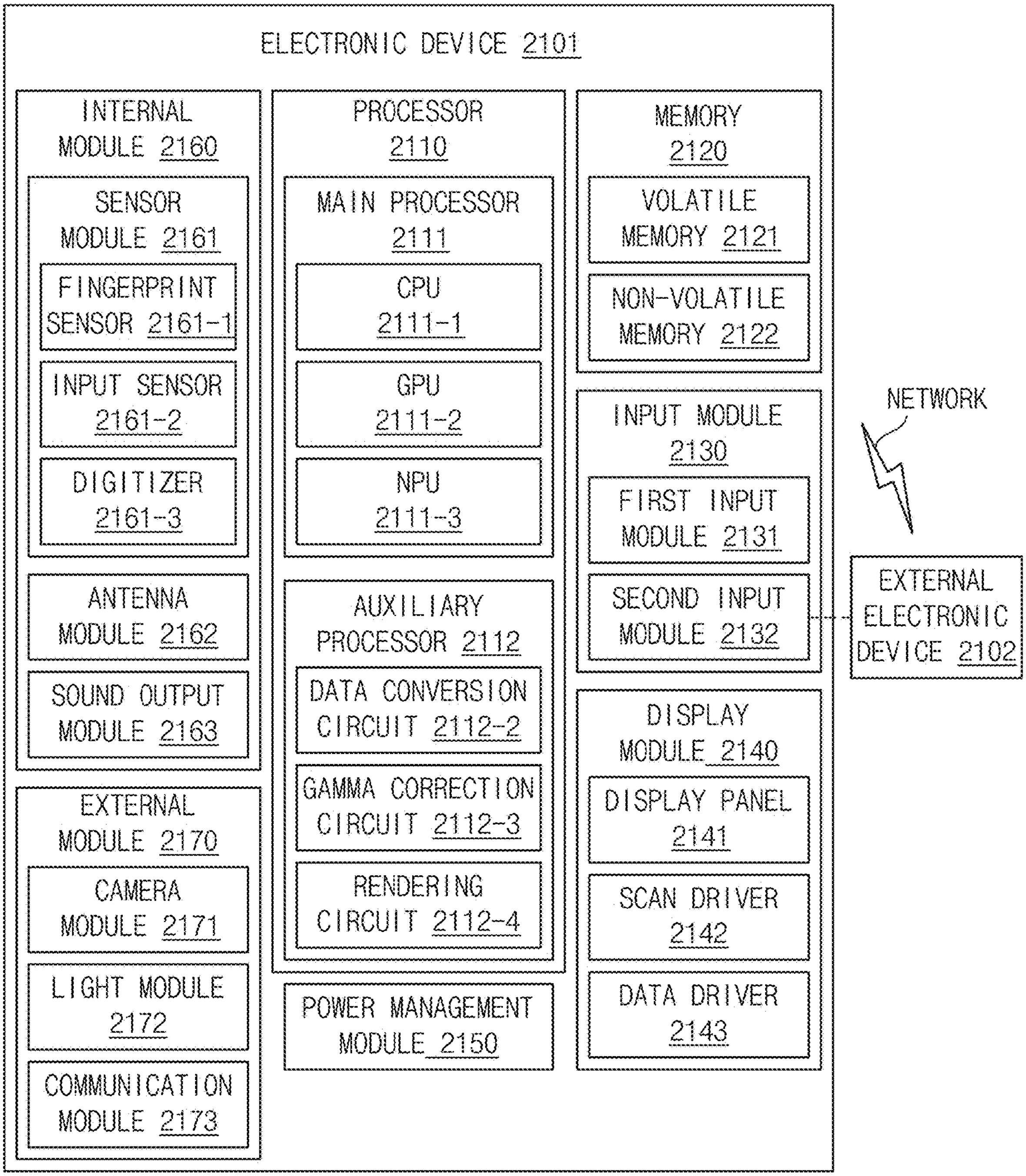
FIG. 17 is a block diagram illustrating an electronic device according to some embodiments.

FIG. 17 is a block diagram illustrating an electronic device according to some embodiments.

Referring to FIG. 1 to FIG. 17, an electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display images corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some components of the electronic device 2101 described below may be integrated and provided as one component or one component may be provided separately as two or more components.

The electronic device 2101 may communicate with an external electronic device 2102 via a network (e.g., a short-range wireless communication network or a long-range wireless communication network). According to some embodiments, the electronic device 2101 may include the processor 2110, the memory 2120, the input module 2130, the display module 2140, a power management module 2150, an internal module 2160 and an external module 2170. According to some embodiments, at least one of the components may be omitted from the electronic device 2101 or one or more other components may be added in the electronic device 2101. According to some embodiments, some of the components (e.g., the sensor module 2161, an antenna module 2162 or the sound output module 2163) may be implemented as a single component (e.g., the display module 2140).

The processor 2110 may execute software to control at least one other component (e.g., a hardware or software component) of the electronic device 2101 coupled with the processor 2110 and may perform various data processing or computation. According to some embodiments, as at least part of the data processing or computation, the processor 2110 may store a command or data received from another component (e.g., the input module 2130, the sensor module 2161 or a communication module 2173) in volatile memory 2121, may process the command or the data stored in the volatile memory 2121 and may store resulting data in non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor (CP) and an image signal processor (ISP). The main processor 2111 may further include a neural processing unit (NPU) 2111-3. The NPU 2111-3 may be a processor specialized in processing an artificial intelligence model and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip) or respective processing units and processors may be implemented as independent components (e.g., a plurality of chips).

The auxiliary processor 2112 may include a controller. The controller may include an interface conversion circuit and a timing control circuit. The controller may receive an image signal from the main processor 2111, may convert a data format of the image signal to meet interface specifications with the display module 2140 and may output image data. The controller may output various control signals required for driving the display module 2140.

The auxiliary processor 2112 may further include a data conversion circuit 2112-2, a gamma correction circuit 2112-3, a rendering circuit 2112-4 or the like. The data conversion circuit 2112-2 may receive image data from the controller. The data conversion circuit 2112-2 may compensate for the image data such that an image is displayed with a desired luminance according to characteristics of the electronic device 2101 or the user's setting or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller and may render the image data in consideration of a pixel arrangement of the display panel 2141 in the electronic device 2101. At least one of the data conversion circuit 2112-2, the gamma correction circuit

2112-3, or the rendering circuit 2112-4 may be integrated in another component (e.g., the main processor 2111 or the controller). At least one of the data conversion circuit 2112-2, the gamma correction circuit 2112-3, or the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one of the volatile memory 2121 or the non-volatile memory 2122.

The input module 2130 may receive a command or data to be used by the components (e.g., the processor 2110, the sensor module 2161 or the sound output module 2163) of the electronic device 2101 from the outside of the electronic device 2101 (e.g., the user or the external electronic device 2102).

The input module 2130 may include a first input module 2131 for receiving a command or data from the user and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. According to some embodiments, the second input module 2132 may include a high definition multimedia interface (HDMI), a universal serial bus (USB) interface, an SD card interface or an audio interface. The second input module 2132 may include a connector that may physically connect the electronic device 2101 to the external electronic device 2102. For example, the second input module 2132 may include an HDMI connector, a USB connector, an SD card connector or an audio connector (e.g., a headphone connector).

The display module 2140 may visually provide information to the user. The display module 2140 may include the display panel 2141, a scan driver 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is limited thereto. The display panel 2141 may be a rigid type display panel or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. For example, the scan driver 2142 may include an amorphous silicon TFT gate driver circuit (ASG), a low temperature polycrystalline silicon (LTPS) TFT gate driver circuit or an oxide semiconductor TFT gate driver circuit (OSG) embedded in the display panel 2141. The scan driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142 or may be integrated into the scan driver 2142.

The data driver 2143 may receive a control signal from the controller, may convert image data into analog voltages (e.g., data voltages) in response to the control signal and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable or a fuel cell. The power management module 2150 may include a power management integrated circuit (PMIC). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131 and may generate an electrical signal or data value corresponding to the input. The sensor module 2161 may include at least one of the fingerprint sensor 2161-1, the input sensor 2161-2, or a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen or may transmit/receive data to/from the active pen.

The input sensor 2161-2 may measure a bio-signal, such as blood pressure, moisture or body fat. For example, when a portion of the body of the user touches a sensor layer or a sensing panel and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen or may transmit/receive data to/from the active pen.

At least one of the fingerprint sensor 2161-1, the input sensor 2161-2, or the digitizer 2161-3 may be implemented as a sensor layer formed on the display panel 2141 through a continuous process. The fingerprint sensor 2161-1, the input sensor 2161-2 and the digitizer 2161-3 may be located above the display panel 2141 or at least one of the fingerprint sensor 2161-1, the input sensor 2161-2, or the digitizer 2161-3 may be located below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be located between the display panel 2141 and a window located above the display panel 2141. According to some embodiments, the sensing panel may be located on the window, but the location of the sensing panel is not limited thereto.

At least one of the fingerprint sensor 2161-1, the input sensor 2161-2, or the digitizer 2161-3 may be embedded in the display panel 2141. In other words, at least one of the fingerprint sensor 2161-1, the input sensor 2161-2, or the digitizer 2161-2 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The antenna module 2162 may include one or more antennas for transmitting or receiving a signal or power to or from the outside. According to some embodiments, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. According to some embodiments, the receiver may be implemented as separate from or as part of the speaker. A sound output pattern of the sound output module 2163 may be integrated into the display module 2140.

The camera module 2171 may capture a still image and a moving image. According to some embodiments, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171 or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system (GNSS) communication module) or a wired communication module (e.g., a local area network (LAN) communication module or a power line communication (PLC) module). The communication module 2173 may communicate with the external electronic device 2102 via a short-range communication network (e.g., Bluetooth™, wireless-fidelity (Wi-Fi) direct or infrared data association (IrDA)) or a long-range communication network (e.g., a cellular network, the Internet or a computer network (e.g., LAN or wide area network (WAN)). These various types of communication modules 2173 may be implemented as a single chip or may be implemented as multi-chips separate from each other.

The input module 2130, the sensor module 2161, the camera module 2171 and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen and may output the image data to the display module 2140. Alternatively, the processor 2110 may generate command data corresponding to the input data and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120 and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161 and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI) or ultra-path interconnect (UPI)). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. For example, the electronic device 2101 may include at least one of a portable communication device (e.g., a smart phone), a computer device, a portable multimedia device, a portable medical device, a camera, a wearable device, or a home appliance. However, the electronic device 2101 according to some embodiments is not limited to the above-described devices.

The display device according to the embodiments may be applied to a display apparatus included in a computer, a notebook, a mobile phone, a smart phone, a smart pad, a PMP, a PDA, an MP3 player, or the like.

The foregoing is illustrative of aspects of some embodiments of the present disclosure and is not to be construed as limiting thereof. Although aspects of some embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of embodiments according to the present disclosure as defined in the appended claims, and their equivalents. In the claims, means-plus-function clauses are intended to cover the structures described herein as performing the recited function and not only structural equivalents but also equivalent structures. Therefore, it is to be understood that the foregoing is illustrative of aspects of some embodiments of the present disclosure and is not to be construed as being limited to the specific embodiments disclosed, and that modifications to the disclosed embodiments, as well as other embodiments, are intended to be included within the scope of the appended claims, and their equivalents. Embodiments according to the present disclosure are defined by the following claims, with equivalents of the claims to be included therein.

What is claimed is:

1. An electronic device comprising:

a display panel including a pixel;

a panel driver configured to drive the display panel in response to a power-on signal; and a power manager configured to apply a power voltage to the panel driver in response to a power voltage start signal, wherein the panel driver includes a voltage generator configured to output a first power voltage to the display panel based on the power voltage, wherein the voltage generator and the power manager are connected through a voltage line, wherein the voltage generator is configured to output a drop voltage to the voltage line in response to a voltage drop start signal, and wherein based on the power voltage being output to the voltage line, voltage generator is configured to output the drop voltage to the voltage line, and wherein the voltage generator comprises a voltage drop circuit configured to output the drop voltage in response to the voltage drop start signal.

2. An electronic device comprising:

a display panel including a pixel;

a panel driver configured to drive the display panel in response to a power-on signal; and a power manager configured to apply a power voltage to the panel driver in response to a power voltage start signal, wherein the panel driver includes a voltage generator configured to output a first power voltage to the display panel based on the power voltage, wherein the voltage generator and the power manager are connected through a voltage line, wherein the voltage generator is configured to output a drop voltage to the voltage line in response to a voltage drop start signal, and wherein based on the power voltage being output to the voltage line, voltage generator is configured to output the drop voltage to the voltage line, wherein a period in which the voltage generator and the power manager are operated includes first to fourth periods, and wherein in the first period, the power-on signal has an activation level, the power voltage start signal has an inactivation level, and the voltage drop start signal has the inactivation level.

3. The electronic device of claim 2, wherein in the second period, the power voltage start signal has the activation level, and the voltage drop start signal has the inactivation level.

4. The electronic device of claim 3, wherein in the second period, the power manager is configured to output the power voltage to the voltage line in response to the power voltage start signal.

5. The electronic device of claim 3, wherein the panel driver further includes:

a gate driver configured to output a scan gate signal and a sensing gate signal to the display panel;

a data driver configured to apply a data voltage to the display panel; and a driving controller configured to control the gate driver, the data driver and the voltage generator, and wherein in the second period, the driving controller performs a first driving operation.

6. The electronic device of claim 3, wherein in the third period, the power voltage start signal has inactivation level, and the voltage drop start signal has an activation level.

7. The electronic device of claim 5, wherein in the third period, the voltage generator is configured to output the drop voltage to the voltage line in response to the voltage drop start signal.

8. The electronic device of claim 7, wherein in the third period, the power manager is configured to stop outputting the power voltage in response to the power voltage start signal.

9. The electronic device of claim 1, wherein the voltage generator further includes:

a voltage output block connected to the voltage line and configured to output the first power voltage.

10. The electronic device of claim 1, wherein the panel driver includes:

a gate driver configured to output a scan gate signal and a sensing gate signal to the display panel;

a data driver configured to apply a data voltage to the display panel;

a sensing driver configured to perform a sensing operation to the display panel; and a driving controller configured to control the gate driver, the data driver, the sensing driver, and the voltage generator, and wherein the pixel includes:

a first transistor including a control electrode connected to a first node, a first electrode connected to a second node, and a second electrode connected to a third node;

a second transistor configured to apply the data voltage to the first node in response to the scan gate signal;

a third transistor configured to connect the second node and a sensing line in response to the sensing gate signal; and a light emitting element including a first electrode connected to the second node and a second electrode configured to receive a second power voltage.

11. An electronic device comprising:

a display panel including a pixel;

a panel driver configured to drive the display panel in response to a power-on signal; and a power manager configured to apply a power voltage to the panel driver in response to a power voltage start signal, wherein the panel driver includes a voltage generator configured to output a first power voltage to the display panel based on the power voltage, wherein the voltage generator and the power manager are connected through a voltage line, wherein the voltage generator is configured to output a drop voltage to the voltage line in response to a voltage drop start signal, wherein the voltage generator is configured to output a driving voltage different from the first power voltage and the drop voltage based on a block signal, and wherein based on the driving voltage being outputted to the voltage line, the voltage generator is configured to output the drop voltage to the voltage line.

12. The electronic device of claim 11, wherein a period in which the voltage generator and the power manager are operated includes first to fourth periods, wherein in the first period, the power-on signal has an activation level, the power voltage start signal has inactivation level, the voltage drop start signal has an inactivation level, and the block signal has an inactivation level.

13. The electronic device of claim 12, wherein in the second period, the power voltage start signal has inactivation level, the voltage drop start signal has an inactivation level, and the block signal has an activation level.

14. The electronic device of claim 13, wherein in the second period, the driving voltage is outputted to the voltage line in response to the block signal.

15. The electronic device of claim 13, wherein the panel driver includes:

a gate driver configured to output gate signals to the display panel;

a data driver configured to apply a data voltage to the display panel; and a driving controller configured to control the gate driver, the data driver and the voltage generator, wherein the gate signals and the data voltage are generated based on the driving voltage, and wherein in the second period, the driving voltage is applied to the gate driver and the data driver in response to a driving voltage start signal.

16. The electronic device of claim 13, wherein in the third period, the power voltage start signal has inactivation level, the voltage drop start signal has an activation level, and the block signal has an inactivation level.

17. The electronic device of claim 16, wherein in the third period, the drop voltage is outputted to the voltage line in response to the voltage drop start signal, and wherein in the third period, outputting of the driving voltage is stopped.

18. The electronic device of claim 16, wherein in the fourth period, the power voltage start signal has an activation level, the voltage drop start signal has an inactivation level, and the block signal has the inactivation level.

19. The electronic device of claim 18, wherein in the fourth period, the power voltage is outputted to the voltage line in response to the power voltage start signal, and wherein in the fourth period, outputting of the drop voltage is stopped.

20. The electronic device of claim 11, wherein the voltage generator includes:

a voltage drop circuit configured to output the drop voltage in response to the voltage drop start signal;

a driving voltage generate circuit configured to output the driving voltage to a voltage block circuit in response to the block signal;

the voltage drop circuit configured to output the driving voltage to the voltage line in response to the block signal; and a voltage output circuit connected to the voltage line and configured to output the first power voltage.

* * * * *